United States Patent [19]

Maubray

[11] Patent Number: 5,218,735
[45] Date of Patent: Jun. 15, 1993

[54] WINDSHIELD WIPER WITH MAIN AND AUXILIARY AIR DEFLECTOR

[75] Inventor: Daniel Maubray, Issy-les-Moulineaux, France

[73] Assignee: Valeo Systemes D'Essuyage, Montigny-Le-Bretonneux, France

[21] Appl. No.: 611,680

[22] Filed: Nov. 13, 1990

[30] Foreign Application Priority Data

Nov. 17, 1989 [FR] France .................. 8915132

[51] Int. Cl.⁵ .................. B60S 1/04; B60S 1/38
[52] U.S. Cl. .................. 15/250.42; 15/250.20
[58] Field of Search .......... 15/250.42, 250.20, 250.35, 15/250.41, 250.36, 250.32

[56] References Cited

U.S. PATENT DOCUMENTS

| 2,794,203 | 6/1957 | Oishei | 15/250.20 |
| 3,618,155 | 11/1971 | Mower | 15/250.42 |
| 3,673,631 | 7/1972 | Yamadai et al. | 15/250.42 |
| 3,685,086 | 8/1972 | Frohlich | 15/250.42 |
| 4,464,808 | 8/1981 | Berry | 15/250.42 |
| 4,561,143 | 12/1985 | Beneteau | 15/250.42 |
| 4,590,638 | 5/1986 | Beneteau | 15/250.42 |
| 4,766,636 | 8/1988 | Shipo | 15/250.42 |

FOREIGN PATENT DOCUMENTS

| 8518515 | 5/1987 | Fed. Rep. of Germany . | |
| 1296311 | 5/1962 | France | 15/250.42 |
| 1370826 | 7/1964 | France | 15/250.20 |
| 2505754 | 11/1982 | France . | |
| 2594083 | 8/1987 | France . | |
| 2610265 | 8/1988 | France | 15/250.42 |
| 2621288 | 4/1989 | France . | |
| 2145928 | 4/1985 | United Kingdom . | |

OTHER PUBLICATIONS

Patent Abstracts of Japan, vol. 12, No. 52, 17 Feb. 88 JP A 62 199558.

Primary Examiner—Harvey C. Hornsby
Assistant Examiner—Gary K. Graham
Attorney, Agent, or Firm—Dennison, Meserole, Pollack & Scheiner

[57] ABSTRACT

A windscreen wiper comprising an air deflector has the form of an arm with a windscreen wiper device articulated thereto, and an air deflector carried by at least one of the elements of the windscreen wiper so as to deflect the air flows which impinge against the elements of the windscreen wiper. An auxiliary air deflector is provided between the air deflector and the surface to be wiped.

20 Claims, 3 Drawing Sheets

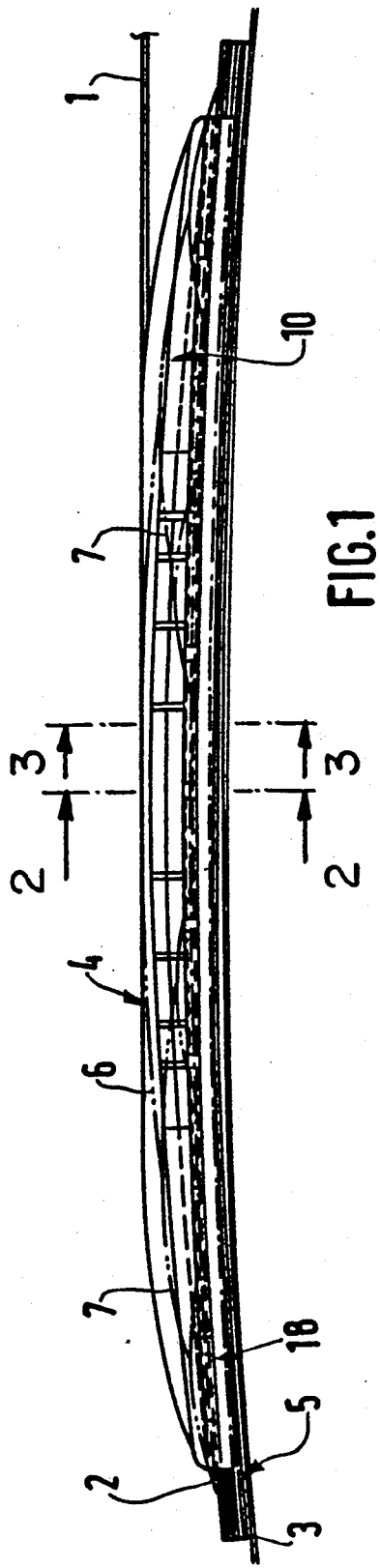
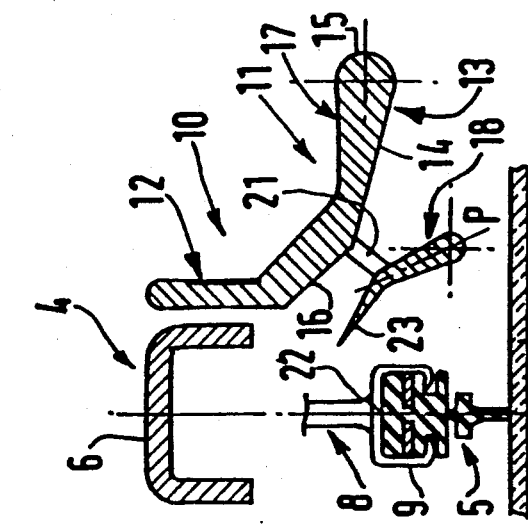
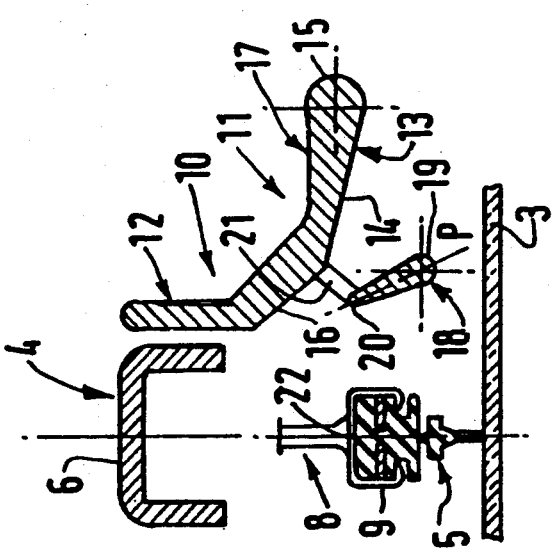
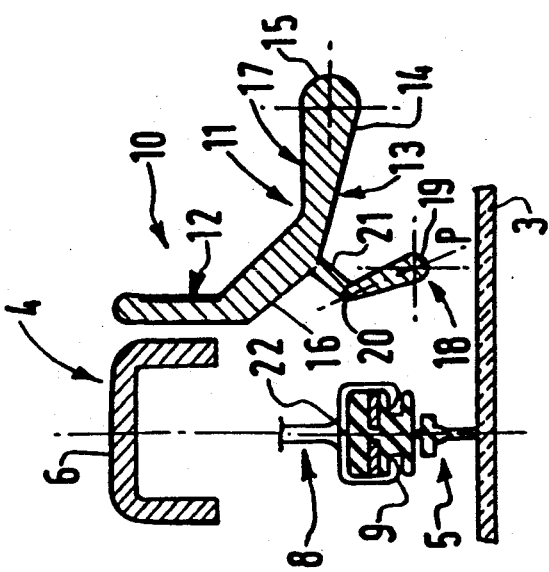

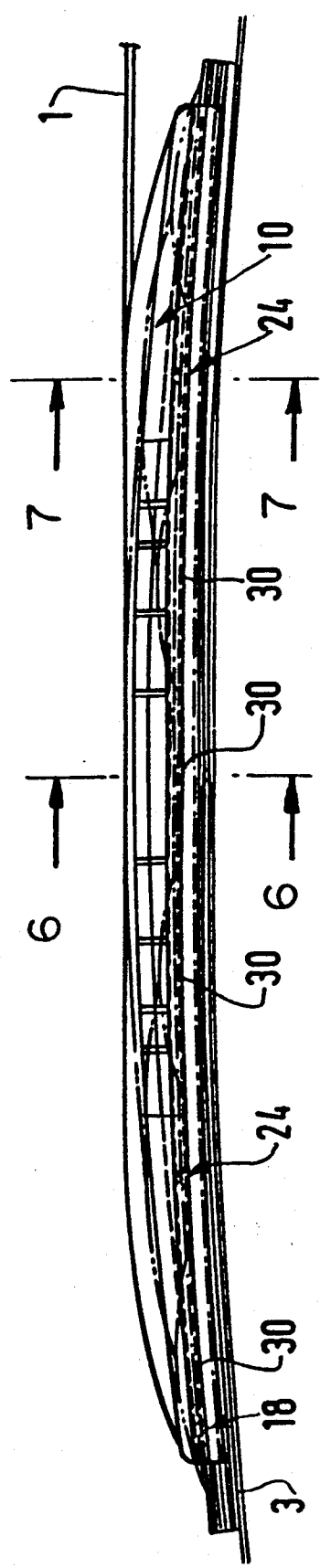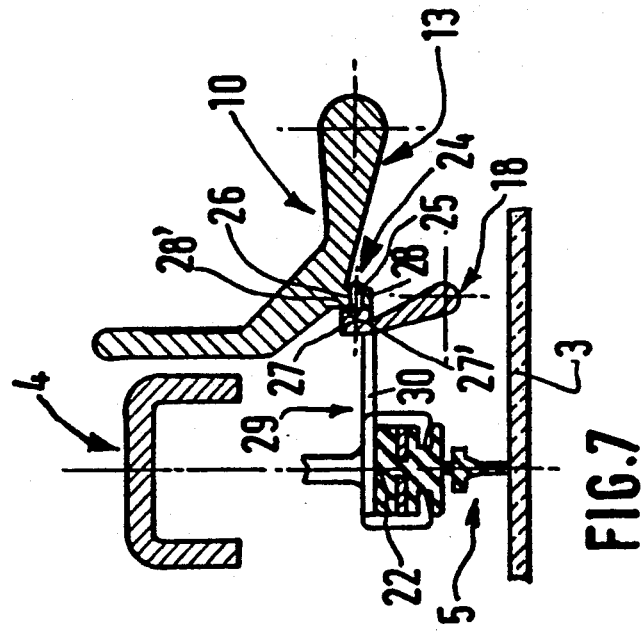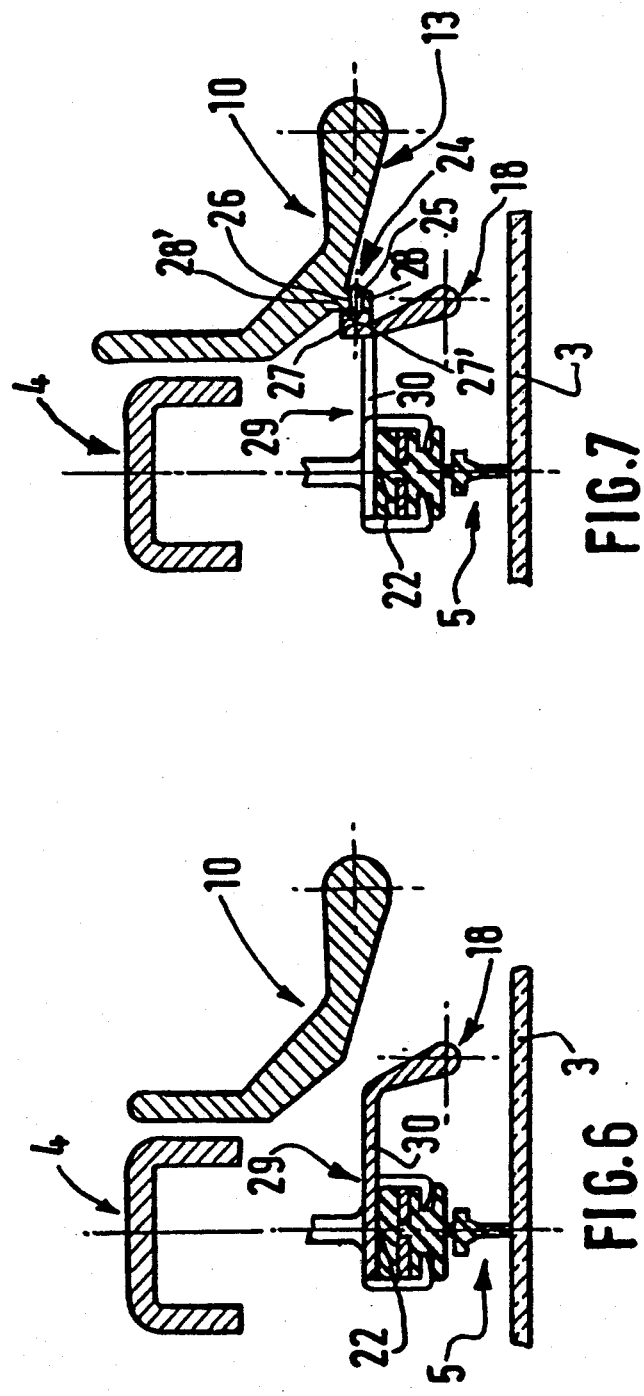

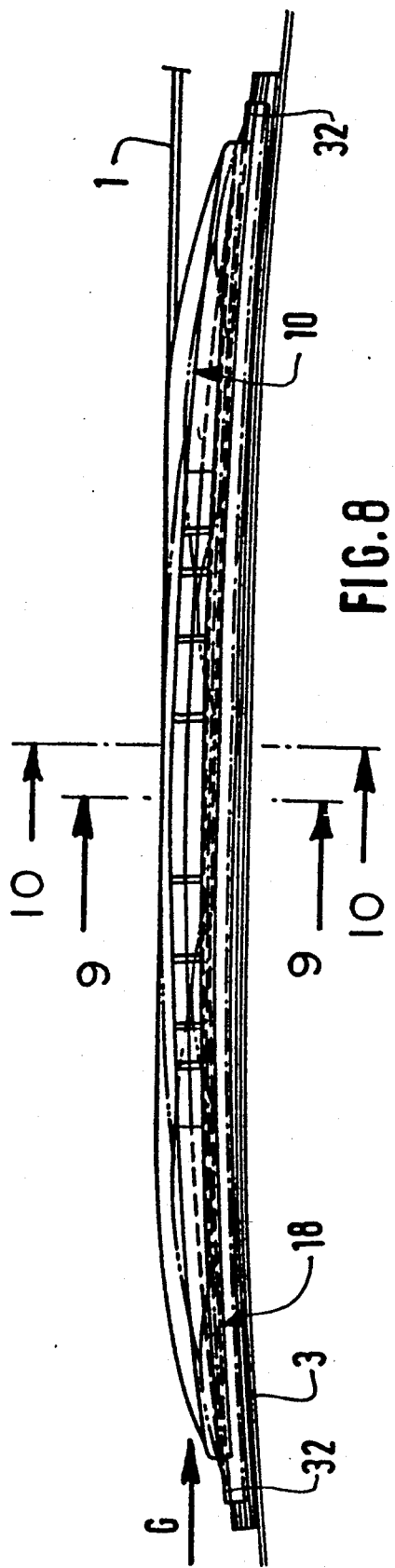
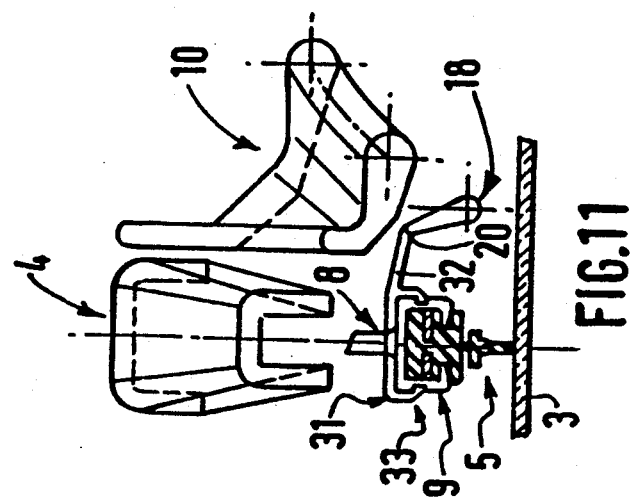
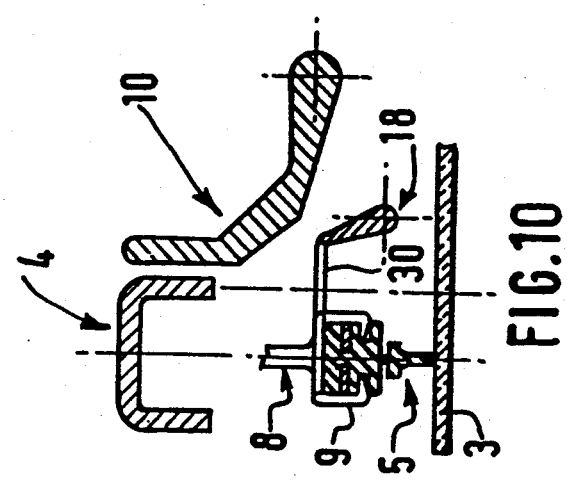
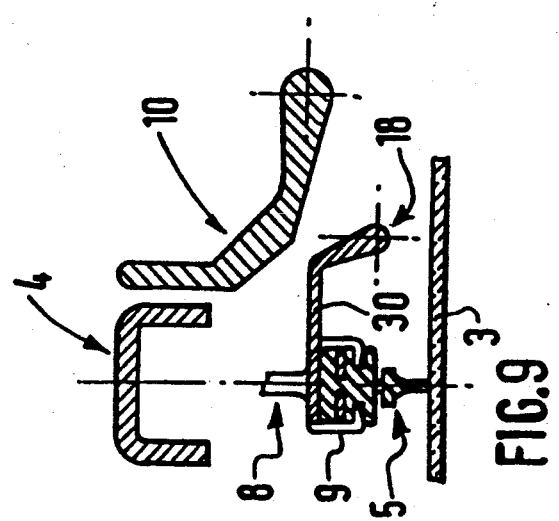

WINDSHIELD WIPER WITH MAIN AND AUXILIARY AIR DEFLECTOR

FIELD OF THE INVENTION

The present invention relates to a windscreen wiper equipped with an air deflector, especially for an automobile vehicle.

BACKGROUND OF THE INVENTION

An air deflector is usually used in connection with a windscreen wiper, generally consisting of a windscreen wiper arm carrying in an articulated manner a windscreen wiper device comprising a mounting which carries a windscreen wiper blade adapted to wipe a glass surface, such as the windscreen of an automobile vehicle.

The general purpose of the air deflector is to deflect the air streams impinging on the wiper device when the vehicle is moving at high speed, in order to prevent lifting of the wiper device, and in particular of the windscreen wiper blade, as a result of the aerodynamic forces created by the air stream, which would leave an intact film of water on the glass surface, eventually interfering with the driver's vision.

A known deflector, in particular that described in FR-A-2 621 288, comprises a shaped part comprising a substantially flat first region extending rearwards from a front edge, the said first region being slightly inclined relative to the mid-plane of the surface to be wiped and a second region following the first and having a greater inclination than the inclination of the first region, the said shaped part being situated at a sufficiently small distance from the surface to be wiped to create a surface effect producing a relatively large decrease in pressure below the deflector, that is to say in the region between the surface to be wiped and the shaped part, which allows correct application of the blade against the glass surface.

This type of deflector is mounted in front of the windscreen wiper device with respect to the direction of flow of the air streams which flow over it.

It has been shown that the air streams, after flowing along the shaped part, impinge against an obstacle formed in part by the wiper blade. This obstacle represents a significant disadvantage since it creates turbulence in the circulation of the air streams which can alter the desired pressure reduction below the shaped part of the deflector and consequently impair the desired surface effect.

DISCUSSION OF THE INVENTION

The object of the present invention is to overcome this disadvantage by providing a windscreen wiper equipped with a deflector of very simple design which makes it possible to obtain a desired surface effect whatever the circulation of the air stream flowing over it may be.

According to the invention, a windscreen wiper for wiping a glass surface such as the windscreen of an automobile vehicle, and comprising two principal elements, one of these elements being a windscreen wiper arm carrying in an articulated manner the other element formed by a windscreen wiper device, at least one of the two elements carrying an air deflector, is characterized in that an auxiliary deflector is provided between the air deflector and the surface to be wiped.

As a result of this arrangement, the air streams which impinge on the windscreen wiper blade are deflected by the auxiliary deflector out of the field of action of the windscreen wiper blade and do not interfere in any way with the pressure reduction produced by the air deflector.

In accordance with another characterizing feature the auxiliary deflector has a profile, in cross-section, which decreases from its front end edge to its rear end edge. In another embodiment, the auxiliary deflector has a general direction which is inclined relative to the surface to be wiped. As a result of the configuration of this auxiliary deflector a pressure reduction is created in front of the windscreen wiper blade carried by the wiper device and this improves the windscreen wiping effect.

In order that the invention may be more fully understood, embodiments in accordance therewith will now be described by way of example only with reference to the accompanying drawings.

BRIEF DESCRIPTION OF THE DRAWINGS

FIG. 1 is a front view of a windscreen wiper comprising an air deflector in accordance with the invention ;

FIG. 2 is a partial view in cross-section along the line 2—2 in FIG. 1 ;

FIG. 3 is a partial view in cross-section along the line 3—3 in FIG. 1 ;

FIG. 4 is a partial view in cross-section showing an alternative embodiment to FIG. 3 ;

FIG. 5 is a front view of a windscreen wiper comprising an air deflector in accordance with another embodiment of the invention ;

FIG. 6 is a partial view in cross-section along the line 6—6 in FIG. 5 ;

FIG. 7 is a partial view in cross-section along the line 7—7 in FIG. 5 ;

FIG. 8 is a front view of a windscreen wiper comprising an air deflector in accordance with another alternative embodiment of the invention ;

FIG. 9 is a partial view in cross-section along the line 9—9 in FIG. 8 ;

FIG. 10 is a partial view in cross-section along the line 10—10 in FIG. 8 ;

FIG. 11 is a view in the direction of the arrow G in FIG. 8.

DESCRIPTION OF THE PREFERRED EMBODIMENTS OF THE INVENTION

FIGS. 1 to 3 show a windscreen wiper comprising an air deflector.

A windscreen wiper usually consists of two principal elements, namely a windscreen wiper arm 1 carrying in an articulated manner a windscreen wiper device 2 adapted to wipe a glass surface 3, such as a windscreen of an automobile vehicle.

The windscreen wiper device 2 comprises, in known manner, a mounting 4 carrying a windscreen wiper blade 5. This mounting consists of a principal stirrup 6 having a generally arched shape, having an inverted U-shaped profile in cross-section (FIG. 2), and at the ends of which at least one support system is articulated (FIG. 1).

In the example described, the support system consists of an intermediate support arm 7 articulated at each end of the principal stirrup 6 and carrying at each of its free ends a secondary support arm 8, partly visible in FIGS. 2 and 3, the said secondary support arms 8 each comprising at their ends clamping devices 9 for holding the windscreen wiper blade 5 on the mounting 4.

In a manner which is likewise known, the windscreen wiper device 2 is adapted to be carried in an articulated manner by the windscreen wiper arm 1 which is equipped with a female articulation part adapted to cooperate with a male articulation part provided in an opening comprised by the mounting 4.

An air deflector 10 is carried by one of the elements described above, which, in the example shown, is the wiper device 2, but it may be that this deflector is carried by the windscreen wiper arm 1, this windscreen wiper arm constituting the other element of the windscreen wiper.

In the following description reference is made to a particular kind of air deflector, but the invention can apply to all other kinds of deflector. The kind of deflector on which the description of the invention is based is described in more detail in document FR-A-2 621 288 and will only be described in outline.

The deflector 10 comprises a shaped portion 11 and a connecting means 12 extending towards the surface to be wiped 3, the said connecting means 12 serving to connect the shaped portion 11, in this case to the wiper device 2, in such a way that the said shaped portion is carried by the wiper device.

Advantageously the shaped portion and the connecting means, the said connecting means consisting in practice of a flange, extend substantially all along the longitudinal extent of the wiper device and are made of rigid plastics material.

The shaped portion 11 has a shape substantially convex towards the surface to be wiped 3 and comprises, on its inner surface 13, a substantially flat first region 14 inclined at a defined angle relative to the surface 3 and extending rearwards from a front edge 15, that is to say towards the wiper device 2, the said front edge 15 having a rounded, substantially semi-cylindrical, shape.

A second region 16 forms a continuation of the first region 14, at a greater angle relative to the surface to be wiped 3 than the angle at which the first region is inclined, in such a way that the profile of the inner surface of the shaped portion 11 is that of a convex dihedron turned towards the glass surface.

The outer surface 17 of the shaped portion 11 has the shape of a concave dihedron, the thickness of the said shaped portion decreasing progressively from the front edge 15 to the wiper device 2.

As can be seen more easily in FIGS. 2 and 3, an auxiliary deflector 18 is provided between the glass surface 3 and the deflector 10, the auxiliary deflector being situated at a substantially equal distance from the surface 3 and the air deflector 10 and extending substantially over the same longitudinal extent as the air deflector 10.

The auxiliary deflector has, in cross-section, an aerodynamic profile, such as a profile which decreases from a front end edge 19, situated substantially facing and at a distance from the surface to be wiped 3, to a rear end edge 20 situated facing the wiper device 2. The distance between the front end edge 19 and the surface to be wiped 3 is smaller than that contemplated between the edge 15 of the air deflector 10 and the surface 3, the said end edges each preferably having a rounded, substantially semi-cylindrical, shape.

The auxiliary deflector 18 forms an angle with the surface to be wiped 3 greater than that formed by the previously defined region 16. This angle is to be considered as existing between a plane P passing through the centre of the auxiliary deflector and the general direction of the glass surface.

The auxiliary deflector 18 is carried by the inner surface 13 of the shaped portion 11 of the air deflector 10, at a distance from the said surface, by means of lugs 21 originating, in the example shown in FIGS. 2 and 3, from the intersection of the regions 14 and 16 and connected to the rear end edge 20 of the said auxiliary deflector, these lugs being substantially orthogonal to the plane P defining the general direction of the auxiliary deflector 18.

Referring to FIG. 1, a plurality of lugs are provided, in this case eleven lugs are regularly spaced along the longitudinal extent of the deflector 10.

In practice the arrangement is such that the air deflector 10, the auxiliary deflector 18 and the lugs 21 are formed in a monobloc or unitary assembly, obtained for example by moulding from a plastics material having a sufficiently rigid constitution to form a unitary assembly.

Thus, the auxiliary deflector 18 extends in a longitudinal direction corresponding to the longitudinal direction of the deflector 10 and is connected to the latter by a plurality of lugs allowing, on the one hand, a stream of air to be deflected by the said auxiliary deflector behind the back 22 of the windscreen wiper blade 5 and, on the other hand, improving the surface effect produced by the shaped portion 11.

Referring to FIG. 4, the auxiliary deflector 18 is prolonged by a spoiler 23 starting at its rear end edge 20 and extending towards the wiper device 2, the profile of which spoiler, in cross-section, decreases in size from the said rear end edge towards the device 2, having a substantially triangular shape the point of which is located at a distance from the said wiper device.

As can be seen more clearly in FIG. 4, this spoiler has a smaller inclination relative to the glass surface than the auxiliary deflector 18.

As a result of this arrangement, the volume delimited by the inner surface 13 of the air deflector 10 and the auxiliary deflector 18 connected to the spoiler 23 consists of a first volume, having, in cross-section, a conical shape delimited by the first region 14 and the auxiliary deflector 18, which is continued, starting from the rear end edge 20 of the said auxiliary deflector, by a second volume delimited by the second region 16 of the deflector 10 and the spoiler 23.

This configuration produces a suction effect on the air steams, as a result of the first volume, which allows the reduction in pressure, and thus the surface effect of the deflector 10, to be improved and an effects of ejecting the said air stream beyond the obstacle formed by the windscreen wiper blade 5.

Referring now to FIGS. 5 to 7 in which the auxiliary deflector 18, as previously defined, is carried at at least two articulation joints 24 by the deflector 10. As can be seen more easily in FIG. 7, the articulation joints 24 consist of rotatable articulations. These rotatable articulations 24 are formed by the cooperation of a spindle 25 with an opening 26.

In the example described the articulation spindle 25 is carried by a protuberance 27 originating from the rear end edge 20 of the auxiliary deflector 18, the protuberance being substantially orthogonal to the surface to be wiped and the spindle being perpendicular tot eh protuberance, and the opening 26 is made in a projection 28 originating from the inner surface 13 of the shaped portion 11 and orthogonal to the glass surface, the protuberance 27 and the projection 28 each comprising a surface 27' and 28' facing one another and adapted to slide on one another during rotatary movement of the auxiliary deflector 18, after mounting of the said auxiliary deflector on the air deflector 10.

Referring in addition to FIG. 6, the auxiliary deflector 18 also comprises means 29 for controlling displacement around the articulation joints 24. These means for controlling the displacement consist of at least one rigid finger 30 originating from the rear end edge 20 of the auxiliary deflector 18 and bearing on the windscreen wiper blade 5.

In practice, these fingers are orthogonal to the general direction of the windscreen wiper blade 5 and bear on the surface of the windscreen wiper blade opposite to that in contact with the surface to be wiped 3, that is to say on the back 22. Referring to FIG. 5, it can be shown that five control fingers 30 are provided regularly spaced along the longitudinal extent of the auxiliary deflector 18.

The action of the auxiliary deflector 18 is explained with reference to FIG. 5 which shows the wiper device-deflector assembly bearing on a glass surface to be wiped 3.

In the case where the surface 3 has a large curvature, the windscreen wiper blade moves to match this curvature thus having an incurved shape in which the region situated in the middle of the length of the blade approaches the principal stirrup 6 whereas the ends of the said blade become further separated from the stirrup. During this movement the windscreen wiper blade 5 acts, in this case by means of its back 22, on the control fingers 30 carried by the auxiliary deflector 18.

These fingers entrain the auxiliary deflector in a movement such that the rear end edge 19 of the deflector elongates whereas its front end edge 20 contracts, giving a curved configuration to the air deflector by movement of its body in the plane P and by partial rotation about the articulation joints 24. This is made possible because the fingers 30 are distinct from the blade 5 and the said fingers can slide substantially horizontally on the back of the said blade.

This action on the fingers 30 by the blade 5 causes a curvature of the deflector 18 which in the end has the same curvature as the said blade. This is produced by rotation of spindles 25 carried by the protuberances 27 connected to the auxiliary deflector 18 in the openings 26 carried by the projections 28 of the air deflector 10. In this case the auxiliary deflector is made of flexible plastic so that it can be deformed.

In the embodiment of the invention shown in FIGS. 8 to 11, the auxiliary deflector 18 is carried near its longitudinal ends at at least two points 31 by one of the constitutive elements of the wiper device 2, in this case, by way of example, by the secondary support arm 8 of the wiper device 2.

As can be seen more clearly in FIG. 11, the rear end edge 20 of the auxiliary deflector 18 is prolonged at each location, facing longitudinal end gripping devices 9 of each support arm 8, by two rigid lugs 32 carrying at their ends hooking-on claws 33 which enclose the gripping devices 9 of the secondary support arm 8.

Thus the auxiliary deflector 18 is fixed at each of its longitudinal ends on the wiper device 2, and any displacement in rotation of the secondary support arm 8 carrying the windscreen wiper blade 5 is reflected by a displacement of the points 31 connecting the auxiliary deflector to the said wiper device.

As described previously, and as is shown in FIGS. 9 and 10, the auxiliary deflector 18 is also provided with control fingers 30 bearing on the back 22 of the blade 5.

The action of the auxiliary deflector 18 is substantially identical to that described above apart from the fact that the connection near the points 31 is a permanent connection and that the elastic deformation occurs between the two points 31 due to the control fingers 30.

The present invention is not limited to the embodiments described above but includes all alternative variations. In particular, the control fingers 30 may be connected to the windscreen wiper blade 5 in such a way that a displacement in the vertical direction of the blade also displaces the auxiliary deflector 18.

What is claimed is:

1. A windscreen wiper for wiping a glass surface such as a windscreen of an automobile vehicle, comprising a first principal element in the form of a windscreen wiper arm carrying in an articulated manner a second principal element comprising a windscreen wiper device, at least one of the two elements carrying an air deflector, and an auxiliary deflector disposed between the said air deflector and the surface to be wiped, said auxiliary deflector being of substantially the same length as said air deflector and extending longitudinally coextensively therewith in spaced relationship in a common plane which is substantially perpendicular to said glass surface.

2. A windscreen wiper according to claim 1, wherein the auxiliary deflector has a profile, in cross-section, which decreases from a front end edge to a rear end edge.

3. A windscreen wiper according to claim 1, wherein the auxiliary deflector is generally inclined relative to the surface to be wiped.

4. A windscreen wiper according to claim 1, wherein the auxiliary deflector has a front end edge facing the windscreen glass and a rear end edge facing away from the windscreen glass and a spoiler extending from its rear end edge.

5. A windscreen wiper according to claim 4, wherein the spoiler is generally less inclined relative to the surface of the windscreen glass than the auxiliary deflector is.

6. A windscreen wiper according to claim 1, wherein the auxiliary deflector is carried by said air deflector.

7. A windscreen wiper according to claim 6, wherein the auxiliary deflector is connected to said air deflector in a unitary manner at a distance therefrom.

8. A windscreen wiper according to claim 6, wherein the auxiliary deflector is connected to said air deflector by at least two connecting lugs.

9. A windscreen wiper according to claim 1, wherein the auxiliary deflector is carried by the air deflector by at least two articulation joints to enable displacement of said auxiliary deflector with respect to said air deflector.

10. A windscreen wiper according to claim 9, wherein the articulation joints permit limited pivotal motion of said auxiliary deflector with respect to said air deflector.

11. A windscreen wiper according to claim 10, wherein the articulation joints comprise a spindle carried by the auxiliary deflector cooperating with an opening comprised by the air deflector.

12. A windscreen wiper according to claim 9, wherein the auxiliary deflector comprises means for controlling its displacement.

13. A windscreen wiper according to claim 1, wherein the auxiliary deflector is carried by at least tow points on said second principal element comprising a windscreen wiper device thereby enabling displacement of the auxiliary deflector with respect to said second principal element.

14. A windscreen wiper according to claim 13, wherein said two points comprise gripping devices.

15. A windscreen wiper according to claim 14, wherein said gripping devices comprise claws.

16. A windscreen wiper according to claim 12, wherein the auxiliary deflector comprises means for controlling its displacement.

17. A windshield wiper assembly for operation over a windshield glass of a vehicle comprising a driving arm (1), a main stirrup (6) oscillated by said driving arm, support means (8) carried by said main stirrup, a wiper blade (5) carried by said support means, a separate air deflector (10) carried by said main stirrup, said air deflector having a profiled portion with a generally concave front face facing away from the windshield glass and a generally convex rear face facing the windshield glass, said air deflector being spaced from said windshield glass a predetermined distance to aerodynamically cooperate therewith in providing a force urging said wiper blade against said glass; and an auxiliary air deflector (18) mounted within said predetermined spaced distance to aerodynamically cooperate with said air deflector in providing an additional force urging said wiper blade against said glass.

18. A windshield wiper assembly according to claim 17 wherein said auxiliary air deflector is supported in said predetermined spaced distance by said air deflector.

19. A windshield wiper assembly according to claim 18 wherein said auxiliary air deflector is formed of flexible material and is supported on said air deflector by two spaced pivotal joints.

20. A windshield wiper assembly according to claim 17 wherein said auxiliary air deflector is supported in said predetermined spaced distance by said wiper blade.

* * * * *